(12) United States Patent
Joshi

(10) Patent No.: US 6,571,173 B1
(45) Date of Patent: May 27, 2003

(54) THREE-DIMENSIONAL SPACE CURVE COMPARISON USING SPATIAL ANGLE VARIANCE METRIC AND APPLICATIONS THEREOF

(75) Inventor: Rajashri Joshi, Schaumburg, IL (US)

(73) Assignee: Navigation Technologies Corporation, Chicago, IL (US)

( * ) Notice: Subject to any disclaimer, the term of this patent is extended or adjusted under 35 U.S.C. 154(b) by 0 days.

(21) Appl. No.: 10/253,221

(22) Filed: Sep. 24, 2002

Related U.S. Application Data

(62) Division of application No. 09/938,974, filed on Aug. 24, 2001, now Pat. No. 6,473,690.

(51) Int. Cl.[7] .......................... G06F 17/40; G01B 11/26
(52) U.S. Cl. .................. 701/207; 701/226; 342/357.01; 342/450; 702/94; 702/150; 702/179; 356/139.03
(58) Field of Search ................................ 701/207, 208, 701/214, 3, 14, 200, 226; 342/41, 357.01, 450; 702/94, 95, 179, 150, 151, 152; 280/735; 356/139.03

(56) References Cited

U.S. PATENT DOCUMENTS

| 4,144,571 A | 3/1979 | Webber | 244/175 |
|---|---|---|---|
| 5,065,348 A | 11/1991 | Kuragano et al. | 395/142 |
| 5,596,494 A * | 1/1997 | Kuo | 348/144 |
| 5,742,924 A | 4/1998 | Nakayama | 701/208 |
| 5,848,377 A * | 12/1998 | Wong | 701/226 |
| 5,969,665 A * | 10/1999 | Yufa | 342/41 |
| 6,088,663 A * | 7/2000 | Wang | 702/179 |
| 6,263,089 B1 | 7/2001 | Otsuka et al. | 382/107 |
| 6,389,333 B1 * | 5/2002 | Hansman et al. | 701/3 |

* cited by examiner

Primary Examiner—Thomas G. Black
Assistant Examiner—Tuan C To
(74) Attorney, Agent, or Firm—Frank J. Kozak; Jon D. Shutter; Lawrence M. Kaplan

(57) ABSTRACT

Methods for comparing three-dimensional space curves are provided. Such methods are particularly useful for map matching in in-vehicle navigation systems as well as for other applications that require accurate positioning of the vehicle with respect to the underlying map data referenced by the system. Additionally, they are useful in measuring and/or evaluating the accuracy of a geographic database. Two angles that define the angular orientation of a three dimensional space curve are determined at corresponding locations for each of a first space curve and a second space curve. The variance of the relationship between the angle pairs at corresponding locations along the first and second space curves is utilized to determine the similarity between the first and second space curves despite any spatial translation and angular rotation between the first and second space curves.

4 Claims, 12 Drawing Sheets

THREE-DIMENSIONAL SPACE CURVE COMPARISON USING SPATIAL ANGLE VARIANCE METRIC AND APPLICATIONS THEREOF

REFERENCE TO RELATED APPLICATION

The present application is a divisional of Ser. No. 09/938,974 filed Aug. 24, 2001, which is now U.S. Pat. No. 6,473,690, the entire disclosure of which is incorporated herein by reference.

FIELD OF THE INVENTION

The present invention relates to data representations of geographic features and more particularly, relates to a way to measure how closely one three-dimensional space curve matches another three-dimensional space curve.

BACKGROUND OF THE INVENTION

There exist applications where it is desirable to compare and match data represented as three-dimensional space curves. One such application is measurement of geographic database accuracy. This application involves measuring how closely a database representation of a geographic feature matches the actual shape of the geographic feature. Another application which requires comparison of three-dimensional space curves is three-dimensional map matching (vehicle positioning). In a map matching application, one way to determine the position of a moving vehicle with respect to a map database is to find the best match between the vehicular path, as determined by processing sensor data, and the database representation of the paths that form the road network upon which the vehicle is traveling.

Currently, geographic features are often represented in two-dimensions in map databases. For example, some of the two-dimensional map data may be represented in both longitudinal and latitudinal directions, but not necessarily in the altitudinal direction. Nevertheless, processing two-dimensional data for map-matching or map database accuracy evaluation can be time consuming and computationally intensive.

To provide a more accurate database representation and/or utilize available sensor information, geographic features may also be represented as three-dimensional space curves in map databases. For example, using modern sensors, some geographic features or vehicular paths may now be represented in three dimensions, i.e., using longitudinal, latitudinal, and altitudinal components. With more information to process than with traditional two-dimensional systems, however, methods for processing three-dimensional space curves may introduce even more complexity, and can be more computationally intensive than systems which utilize two-dimensional data. Applications using three-dimensional data might require alternative methods for comparing and matching the space curves.

Accordingly, there exists a need to compare and match a three-dimensional space curve to another three-dimensional space curve in a computationally efficient manner.

SUMMARY OF THE INVENTION

To address these and other objectives, the exemplary embodiments provide methods for comparing and quantifying the degree of shape similarity between space curves in three-dimensional space.

According to an exemplary embodiment, tangent vectors are determined at corresponding locations along first and second three-dimensional space curves. A first difference between the angles made by a projection onto a plane of each tangent vector at corresponding locations with an axis within the plane is computed. A second difference between the angles made by the tangent vectors at corresponding locations and the plane is computed. A variance is computed of pairs comprised of corresponding first and second angle differences from a constant. The variance is an indication of how closely the first and second space curves match.

According to another exemplary embodiment, a three-dimensional space curve representation of a vehicle trajectory is compared to a three-dimensional space curve representation of a road. Tangent vectors are computed at corresponding locations along the three-dimensional space curve representations. The degree of similarity between the representations may be determined as described in the first exemplary embodiment.

In yet another exemplary embodiment, database accuracy is determined. A three-dimensional space curve representation of a geographic feature is compared to a more accurate three-dimensional space curve representation of the same geographic feature. Tangent vectors are computed at corresponding locations along the three-dimensional space curve representations. The degree of similarity between the representations may be determined as described in the first exemplary embodiment.

The exemplary embodiments provide a quantitative measure of the similarity between a pair of space curves in three-dimensional space. They are effective tools for comparing three dimensional space curves while being simple, intuitive and computationally non-intensive. The exemplary embodiments are particularly useful for map matching in in-vehicle navigation systems as well as for other applications that require accurate positioning of the vehicle with respect to the underlying map data referenced by the system. Additionally, they are useful in measuring and/or evaluating the accuracy of a geographic database.

The foregoing and other objects, features and advantages will be apparent from the following more particular description of preferred embodiments as illustrated in the accompanying drawings.

DETAILED DESCRIPTION OF PREFERRED EMBODIMENTS

Methods are provided for comparing and matching three-dimensional space curves and for quantifying their shape similarity. The methods are used to implement map matching in in-vehicle navigation systems by comparing a three-dimensional historical vehicular path to possible three-dimensional candidate database paths. The methods are also used for measuring map database accuracy by comparing three-dimensional representations of geographic features to the actual or more accurately known three-dimensional representations of the geographic features. However, it should be understood that the methods and systems described herein are not limited to in-vehicle navigation or database accuracy applications. Therefore, details regarding the in-vehicle navigation or database accuracy applications are not necessary to the invention.

SPATIAL ANGLE VARIATION METRIC

Figure 1:
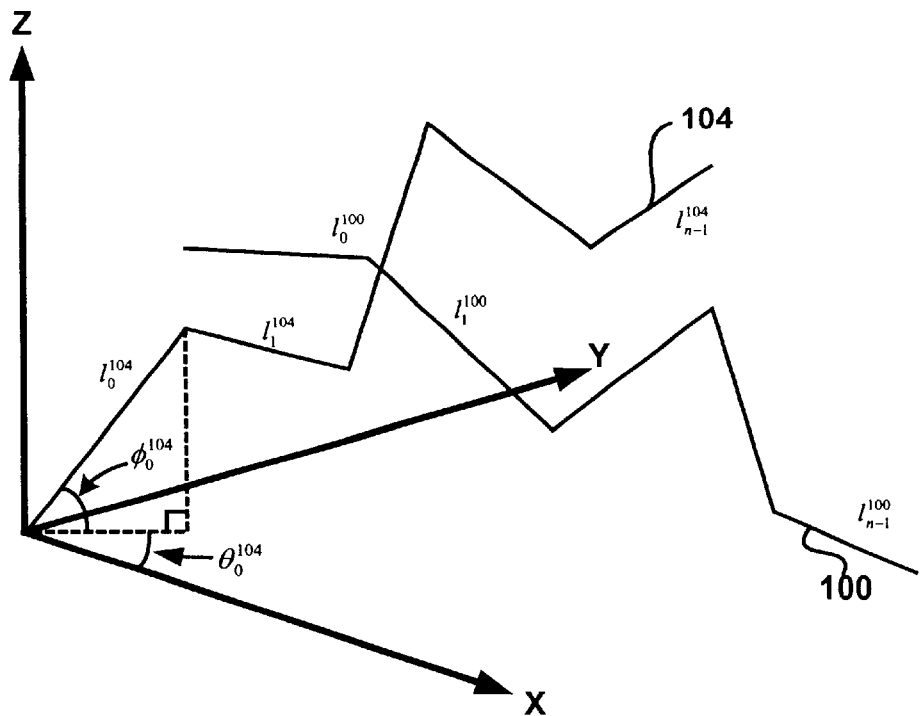
FIG. 1 illustrates two exemplary space curves in a three-dimensional coordinate system.

FIG. 1 illustrates two exemplary space curves given by 100 and 104 in a three-dimensional coordinate system. A space curve can include any straight or curved geometric element that is generated by a moving point in three-dimensions (e.g., x, y, and z directions). In this example, the space curves 100 and 104 are polylines made up of n line segments given by $l_0^{100}, l_0^{100}, \ldots, l_{n-1}^{100}$ for space curve 100 and n line segments given by $l_0^{104}, l_1^{104}, \ldots, l_{n-1}^{104}$ for space curve 104. The three-dimensional coordinate system utilized in this example includes an x or longitude axis, y or latitude axis, and z or altitude axis. Coordinate systems including the Cartesian, spherical, or cylindrical coordinate systems may be utilized. For purposes of illustration, assume that space curve 100 is a reference space curve to which the space curve 104 is compared.

If space curve 104 is uniformly translated and/or rotated with respect to space curve 100, the relative proportions are maintained between the two space curves 100 and 104. Thus, determining how closely the two space curves 100 and 104 compare is equivalent to determining whether one of the space curves is nearly a spatially translated and/or rotated and/or scaled version of the other space curve. According to this example, space curve 104 is translated and rotated with respect to space curve 100, but is otherwise identical to space curve 100. To compare space curve 104 to space curve 100, the length of space curve 104 is preferably scaled so that its length equals that of space curve 100. Alternatively, both space curves 100 and 104 can be scaled to a nominal length of unity.

For each space curve 100 and 104, let $\theta_i$ denote the angle made with the x-axis by a projection of line segment $l_i$ onto the x-y plane, and let $\phi_i$ be the angle made by line segment $l_i$ with the x-y plane, where i represents the $i^{th}$ line segment. For space curve 104, $\theta_0^{104}$ is the angle made by the projection of line segment $l_0^{104}$ onto the x-y plane with the x-axis, and $\phi_0^{104}$ is the angle made by $l_0^{104}$ with the x-y plane. These angles are shown only for line segment $l_0^{104}$ of space curve 104 for purposes of illustration. Note that these two angles $\theta_0^{104}$ and $\phi_0^{104}$ together define the angular orientation of line segment $l_0^{104}$ three-dimensional space. To define the angular orientation of space curve 104, the angles $\theta_0^{104}, \theta_1^{104}, \ldots, \theta_{n-1}^{104}$ and $\phi_0^{104}, \phi_1^{104}, \ldots, \phi_{n-1}^{104}$ are preferably computed, where each line segment $l_i^{104}$ is defined by a pair of angles given by $(\theta_i^{104}, \phi_i^{104})$. Moreover, the angles $\theta_0^{100}, \theta_1^{100}, \ldots, \theta_{n-1}^{100}$ and $\phi_0^{100}, \phi_1^{100}, \ldots, \phi_{n-1}^{100}$ are similarly computed for line segments $l_0^{100}, l_1^{100}, \ldots, l_{n-1}^{100}$ to define the angular orientation of space curve 100.

Now consider line segments labeled $l_0^{100}$ and $l_0^{104}$. Note that the angles $(\theta_0^{100}, \phi_0^{100})$ made with the x-axis by a projection of $l_0^{100}$ onto the x-y plane and by $l_0^{100}$ with the x-y plane, are respectively different than the angles $(\theta_0^{104}, \phi_0^{104})$ made with the x-axis by a projection of $l_0^{104}$ onto the x-y plane and by $l_0^{104}$ with the x-y plane, because the space curves 100 and 104 are translated and rotated with respect to each other. Similarly, the same can be said of the pairs $(\theta_1^{100}, \phi_1^{100})$ and $(\theta_2^{104}, \phi_2^{104})$, and so on. However, also note that because the space curves 100 and 104 are identical, the difference between the angles made by the projection of corresponding line segments of the space curves 100 and 104 with the x-axis is constant. Likewise, the difference between the angle made by corresponding line segments of the space curves 100 and 104 with the x-y plane is constant. Thus, the following may be found:

$$(\theta_0^{100}-\theta_0^{104}, \phi_0^{100}-\phi_0^{104})=(\theta_1^{100}-\theta_1^{104}, \phi_1^{100}-\phi_1^{104})=\ldots=(\theta_{n-1}^{100}-\theta_{n-1}^{104}, \phi_{n-1}^{100}-\phi_{n-1}^{104})$$

Denoting $\theta_i^{100}-\theta_i^{104}=d\theta$ and $\phi_i^{100}-\phi_i^{104}=d\phi$, the following relationship is obtained.

$$(d\theta_0, d\phi_0)=(d\theta_1, d\phi_1)=\ldots=(d\theta_{n-1}, d\phi_{n-1})$$

Figure 2:
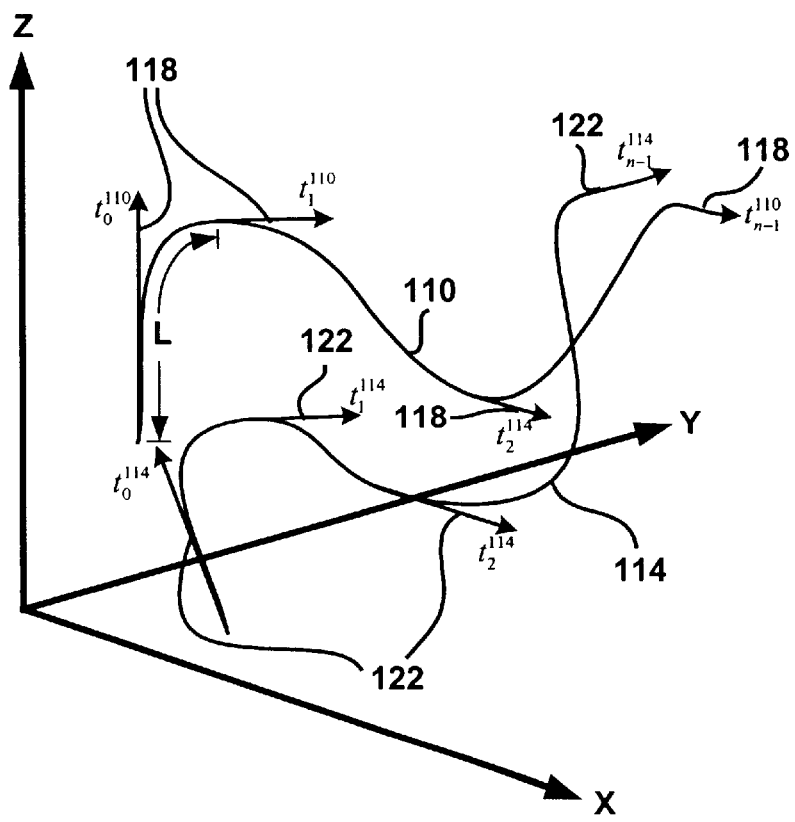
FIG. 2 illustrates another set of exemplary space curves in a three-dimensional coordinate system.

FIG. 2 illustrates another set of exemplary space curves given by 110 and 114 in a three-dimensional coordinate system. In this example, space curve 110 is a curved segment, and space curve 114 is another curved segment. Similar to the coordinate system of FIG. 1, a three-dimensional coordinate system is utilized in this example, which includes an x or longitude, y or latitude, and z or altitude axis. For purposes of this illustration, assume that space curve 110 is a reference space curve to which the space curve 114 is compared.

Using the above concepts, if space curve 114 is uniformly translated and/or rotated with respect to space curve 110, the relative proportions are retained between the two space curves 110 and 114. Thus, determining how closely the two space curves 110 and 114 compare is equivalent to determining whether one of the shapes is nearly a translated and/or rotated and/or rotated version of the other space curve. According to this example, space curve 114 is translated and/or rotated and/or scaled with respect to space curve 110. To accurately compare space curve 110 to space curve 114, space curve 114 is preferably scaled so that its length equals that of space curve 110. Alternatively, both space curves 110 and 114 can be scaled to a nominal length of unity.

Preferably, n tangent vectors 118 are computed along space curve 110, and n tangent vectors 122 are computed along space curve 114 at corresponding points to space curve 110. Thus, space curve 110 and space curve 114 have tangent vectors computed at corresponding locations, where corresponding locations are an equal distance from a nominal starting point of each space curve. For purposes of illustration, the tangent vectors 118 and 122 are given by $t_i^{110}$ and $t_i^{114}$, respectively, where i represents the $i^{th}$ tangent vector. For example, the first tangent vector $t_0^{110}$ is preferably tangent to space curve 110 at a nominally chosen starting point along space curve 110. Then, some length given by L along space curve 110, another tangent vector $t_1^{110}$ is preferably computed. This process preferably continues until n tangent vectors 118 are computed along space curve 110. Likewise, a first tangent vector $t_0^{114}$ is preferably tangent at a nominally starting point along space curve 114. Then, a length L along space curve 114, a second tangent vector $t_1^{114}$ is preferably computed until n tangent vectors 118 are computed along space curve 114. Preferably, each tangent vector along space curve 110 occurs at corresponding locations along space curve 114.

Figure 3:
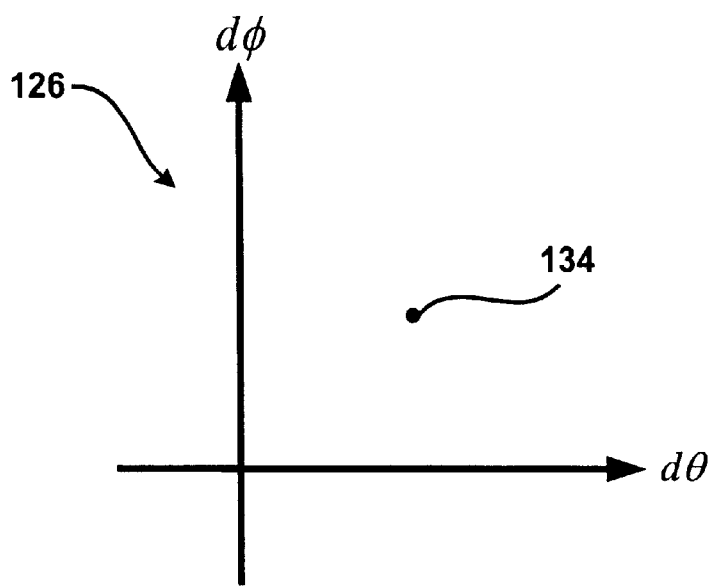
FIG. 3 illustrates an exemplary $d\theta$-$d\phi$ plane for plotting coordinate angle pairs of the space curve in FIG. 2.

Let $\theta_i$ denote the angle made with the x-axis by the projection of a tangent vector $t_i$ onto the x-y plane, and let $\phi_i$ be the angle made by $t_i$ with the x-y plane. Since the two space curves 110 and 114 are identical, each point $(d\theta_i, d\phi_i) = (\theta_i^{110} - \theta_i^{114}, \phi_i^{110} - \phi_i^{114})$ is identical i.e., $$(d\theta_0, d\phi_0) = (d\theta_1, d\phi_1) = \ldots = (d\theta_{n-1}, d\phi_{n-1})$$

and if the points are plotted on the $d\theta$–$d\phi$ plane, these points coincide to form a single point. FIG. 3 illustrates an exemplary $d\theta$–$d\phi$ plane 126 with a point 134 generated by points $(d\theta_i, d\phi_i)$ determined for each of the tangent vectors 118 and 122. Because the two space curves 110 and 114 are identical, the plot comprises a single point 134. From this plot, a variance referred to as Spatial Angle Variation Coefficient (SAVC) can be calculated around the mean of the points $(d\theta_i, d\phi_i)$. SAVC is a quantitative measure of geometric distortion between a pair of geometric shapes. An SAVC of zero indicates that the space curves 110 and 114 may be mutually translated and or rotated, but are otherwise identical. A large SAVC indicates that the angle(s) of rotation is not constant, which means that the curves have very dissimilar shapes. The totality of the SAVC, and the plot from which it is derived, is referred to as the Spatial Angle Variation Metric or SAVM. In this example, because the space curves 110 and 114 are identical, a single point 134 is generated, and the SAVC therefore is zero. Note that this method of shape comparison is invariant to relative spatial rotation between the two space curves 110 and 114.

Figure 4:
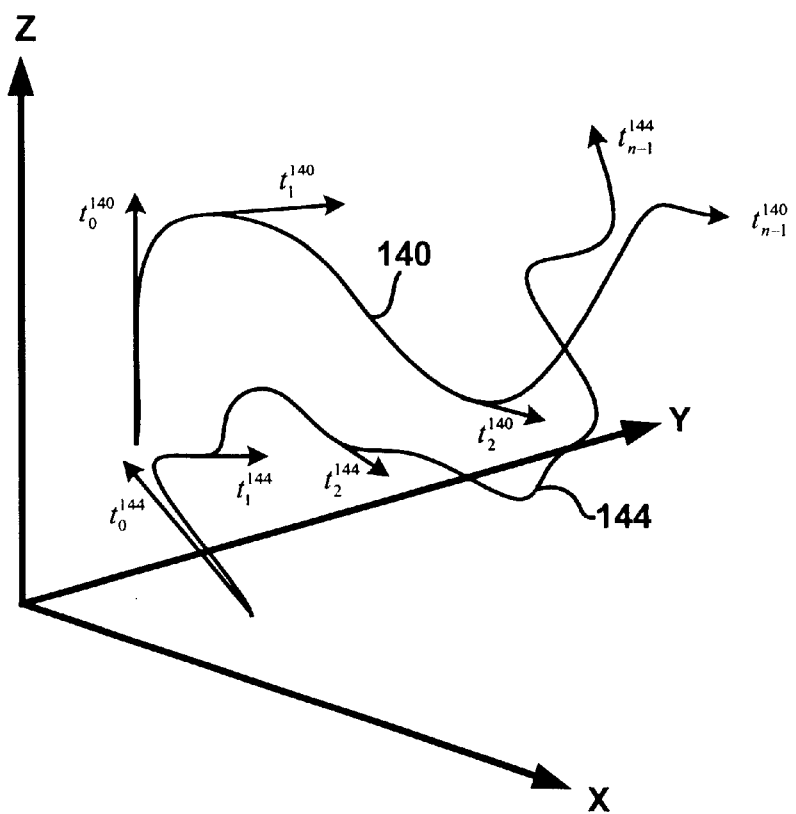
FIG. 4 illustrates yet another set of exemplary space curves in a three-dimensional coordinate system.
Figure 5:
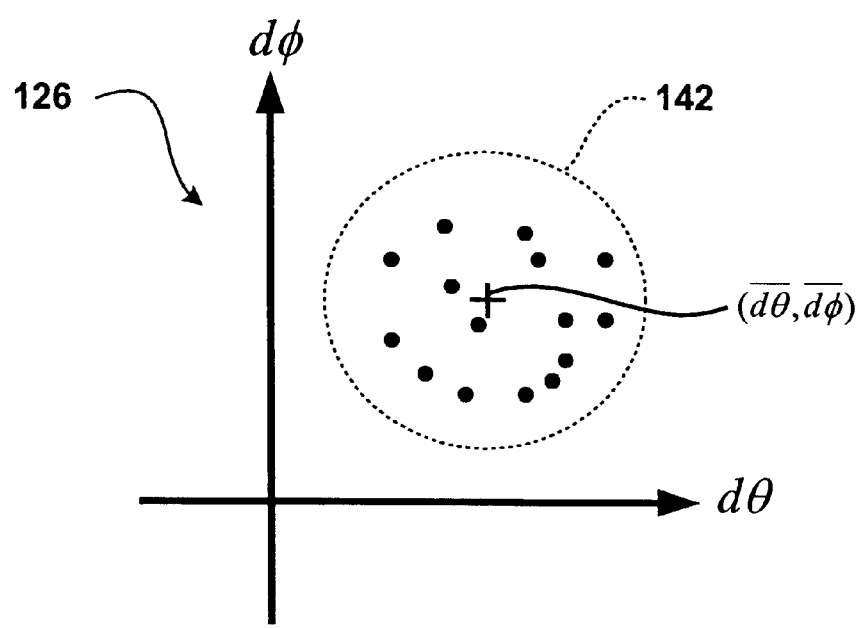
FIG. 5 illustrates another exemplary $d\theta$-$d\phi$ plane for plotting coordinate angle pairs of the space curve in FIG. 4.

FIG. 4 illustrates yet another set of exemplary space curves given by 140 and 144 in a three-dimensional coordinate system. As illustrated, space curve 140 does not appear to have the same shape as space curve 144. However, to compare space curve 140 to space curve 144 (or vice-versa), the space curves 140 and 144 are scaled so that their lengths are equal. Alternatively, both space curves 140 and 144 can be scaled to a nominal length of unity. In this example, the points $(d\theta_i, d\phi_i)$ are not constant for each pair of corresponding tangent vectors $t_i^{140}$ and $t_i^{144}$ for space curves 140 and 144, respectively. Referring to FIG. 5, the plot of $(d\theta_i, d\phi_i)$ in the $d\theta$–$d\phi$ plane is a scattering of points, or a region, in the limit, as $n \to \infty$ with points 142 determined for each of the tangent vectors 140 and 144.

The variance of the plot around a constant or mean value $(\overline{d\theta_i}, \overline{d\phi_i})$ is greater than zero, representing a geometric distortion between the space curves 140 and 144, described below.

An exemplary way to determine a constant is to find the mean of the points of FIG. 5. For this example, let $(d\theta_i, d\phi_i)$ denote the point $(\theta_i^{140} - \theta_i^{144}, \phi_i^{140} - \phi_i^{144})$ and let $(\overline{d\theta_i}, \overline{d\phi_i})$ denote the mean of these points. The mean of the points $(\overline{d\theta_i}, \overline{d\phi_i})$ might be calculated as follows:

$$\overline{d\theta} = \frac{1}{n}\sum_{i=0}^{n-1} d\theta_i \quad \text{and} \quad \overline{d\phi} = \frac{1}{n}\sum_{i=0}^{n-1} d\phi_i$$

The Spatial Angle Variation Coefficient, SAVC, also denoted as $\sigma_{SA}^2$, of the plot may be then given by the mean squared error between each point $(d\theta_i, d\phi_i)$ and the mean value $(\overline{d\theta}, \overline{d\phi})$ of these points. Accordingly, the SAVC may be given by:

$$\sigma_{SA}^2 = \frac{1}{n}\sum_{i=0}^{n-1}(d\theta_i - \overline{d\theta})^2 + (d\phi_i - \overline{d\phi})^2$$

The SAVC, i.e., $\sigma_{SA}^2$ is a measure of the dissimilarity between the space curves 140 and 144. An SAVC of zero indicates that each point of the reference space curve 140 and corresponding point of the non-reference space curve 144 are rotated and/or translated, and/or scaled in space by an equal amount—the two space curves 140 and 144 are therefore identical. If, on the other hand, the variance is large, this indicates that corresponding points of the reference space curve 140 and the non-reference space curve 144 are rotated by varying angles, and the relative proportions of the two curves are therefore different. According to this example, the variance would be large indicating the space curves 140 and 144 are not identical.

The development of the SAVM is based on the observation that if a pair of space curves in three-dimensional space are identical, then one curve can be considered to be a spatially translated and/or rotated version of the other shape. The difference between the angle made with the x-axis by the projections of corresponding pairs of tangent vectors onto the x-y plane is zero and the difference between the angle made by corresponding pairs of tangent vectors with the x-y plane is zero. The larger the variation in the pair consisting of these two angle differences, the greater the dissimilarity between the two three-dimensional space curves.

The SAVM thus measures the degree of similarity between a pair of three-dimensional space curves by measuring the variation in the angle difference pair which defines the angular relationship between corresponding pairs of tangent vectors. No variation in the angle difference pair (i.e., constant angular relationship) implies that the three-dimensional space curves are identical (to within a spatial rotation and translation) and a large variation in the angular relationship implies that the three-dimensional space curves vary greatly. Thus, the SAVM utilizes the angle difference pairs $(d\theta_i, d\phi_i) = (\theta_i - \theta_i, \phi_i - \phi_i)$ to determine, similarities between space curves. It should be noted that there are also other ways to calculate the angle pair within the spirit of the embodiment.

Figure 6A:
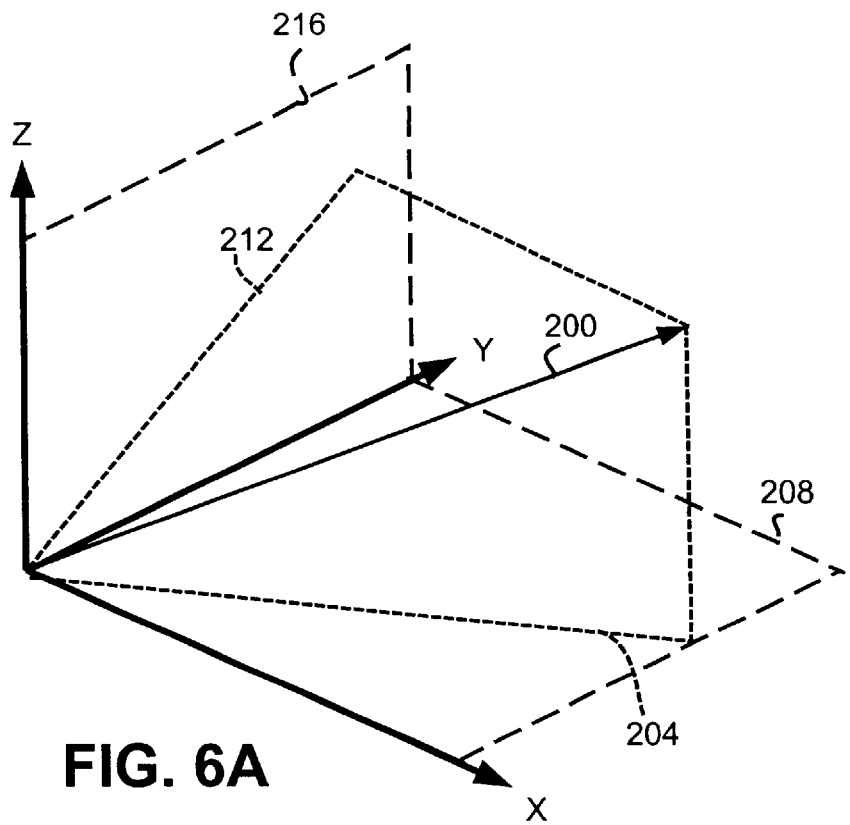
FIGS. 6A and 6B illustrate another approach to measuring the coordinate angle pair.
Figure 6B:
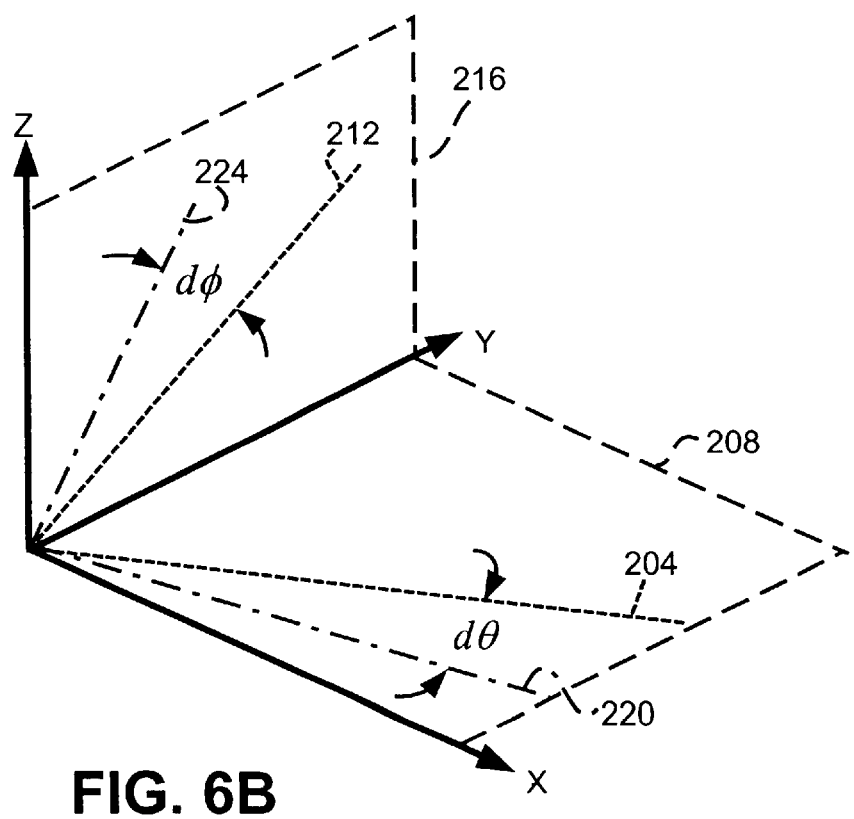

FIGS. 6A and 6B illustrate another approach to calculating the coordinate pair of angles. Referring first to FIG. 6A, assume that the space curve 200 is a vector originating at the origin of a three-dimensional coordinate system. Assume also that any given point (x, y, z) along the space curve 200 is projected onto the x-y plane 208. The projection onto the x-y plane is labeled 204. Additionally, any given point along the space curve 200 is preferably projected onto a plane perpendicular to the x-y plane 208, such as the y-z plane 216. The projection onto the y-z plane is labeled 212.

Turning now to FIG. 6B, assume for simplicity that a second space curve (not shown for clarity of explanation) is a vector also originating at the origin (although note that neither space curve 200 or the second space curve have to originate at the origin). Space curve 200 and the second space curve have been left out of FIG. 6B for clarity of illustration. Assume also that any given point (x, y, z) along the second space curve is projected at 220 onto the x-y plane 208. Additionally, any given point along the second space curve is projected at 224 onto a plane perpendicular to the x-y plane 208, such as the y-z plane 216. Then, the angle pair $(d\theta_i, d\phi_i)$ can be computed as the angle between projection 204 and 220 on the x-y plane 208, and by the angle between projection 212 and 224 on the y-z plane 216, respectively. The SAVC may then be calculated using the computed angle pair.

APPLICATION OF SAVM TO MAP-MATCHING

The SAVM may be utilized in three-dimensional map matching to measure the similarity in shape between the vehicle trajectory (historical vehicular path) and all possible map paths in the map database. At fixed intervals, such as once every second or ten seconds, the respective SAVC values (i.e., $\sigma_{SA}^2$ values) between the vehicle trajectory and the possible paths in the map database are computed. The path corresponding to the smallest SAVC value is taken to be the one on which the vehicle is most likely to be located. FIGS. 7–15 illustrates an exemplary map-matching process utilizing SAVM.

Figure 7:
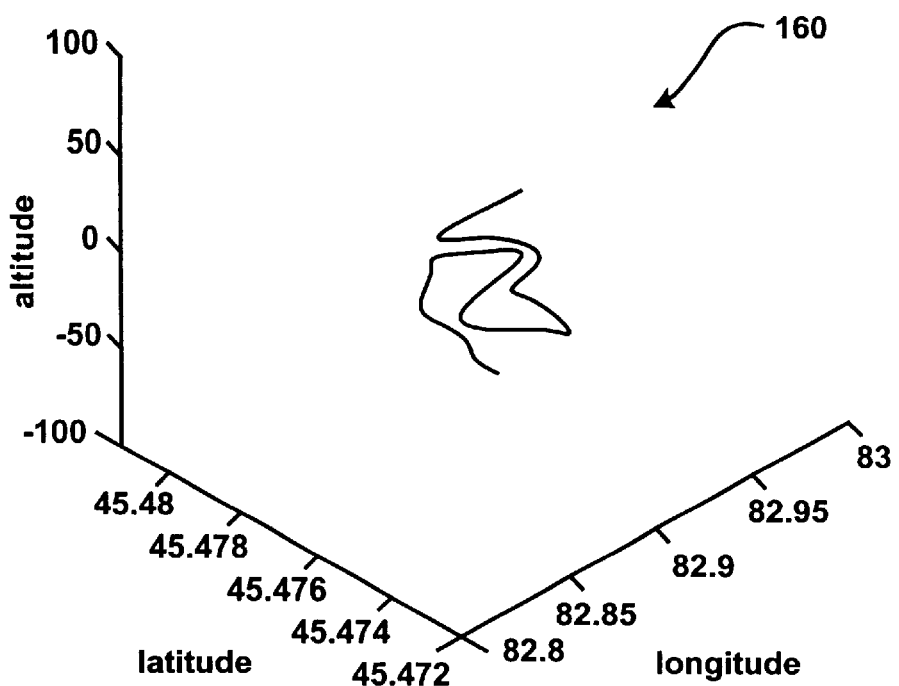
FIG. 7 illustrates a portion of an exemplary road network.

FIG. 7 illustrates a portion of an exemplary road network 160. This road network 160 might be stored in a database and utilized as a reference source. The vehicle trajectory may then be matched to paths on the road network 160 to determine where the vehicle is located and the path on which the vehicle is traveling. Preferably, for purposes of efficiency and to reduce any unnecessary computation, only map paths that lie on a portion of the road network 160 that is nearest the vehicle are examined.

Figure 8:
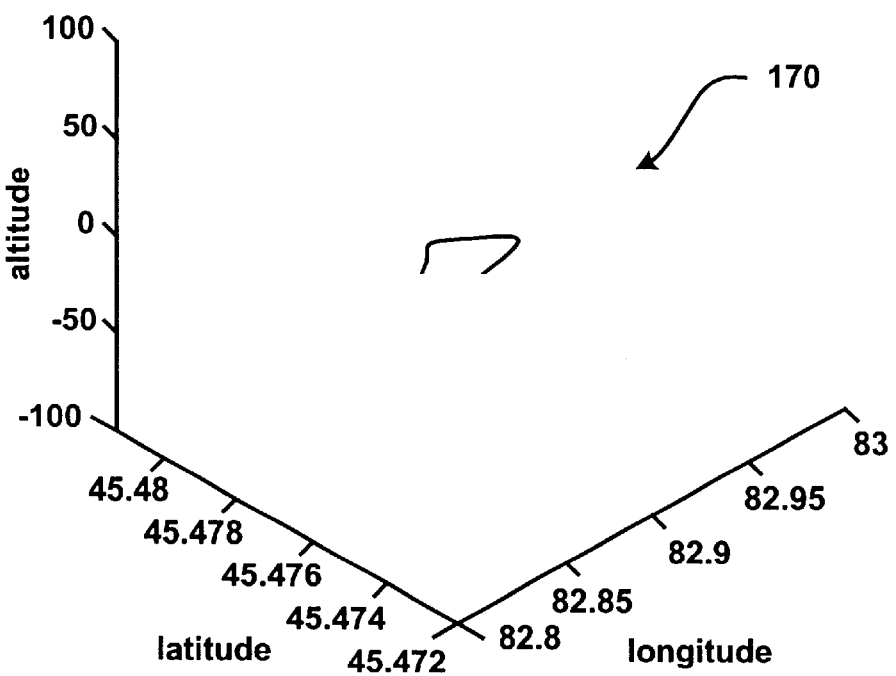
FIG. 8 illustrates an exemplary sample of a vehicular path over a finite period of time.

FIG. 8 illustrates an exemplary sample of the vehicular path 170 over a finite period of time. The number of samples may generally correspond to the sampling times of the sensors measuring the speed, current vehicle coordinates, etc. To determine if the vehicle is located on the road network 160, and if so, the location of the vehicle in relation to the road network 160, the vehicular path 170 is compared to portions of the road network 160. If a match is not found, the navigation system may look to other road networks (not shown) that may be in the near vicinity of the vehicle for comparison. Assume for this example that the vehicular path 170 is located somewhere in the road network 160.

Figure 9A:
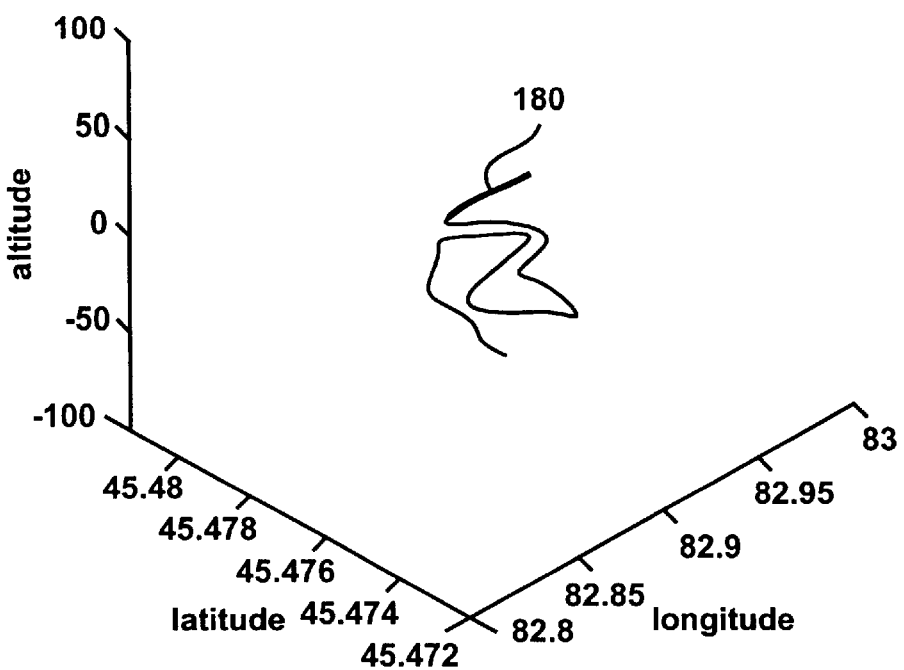
FIGS. 9A and 9B illustrate an exemplary first attempt at matching the vehicular path in FIG. 8 to a portion of the road network in FIG. 7.
Figure 9B:
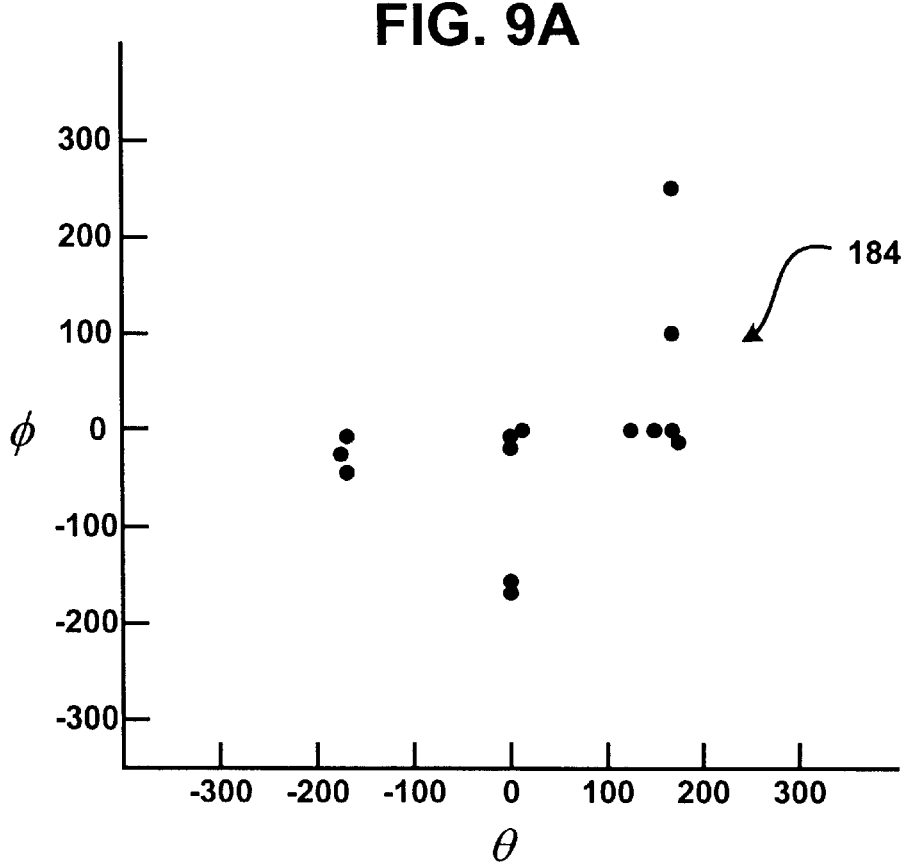

FIG. 9A illustrates an exemplary first attempt at matching the vehicular path 170 to a portion given by 180 of the road network 160. FIG. 9B illustrates a plot 184 of the SAVM which indicates a SAVC of 1896.679.

Figure 10A:
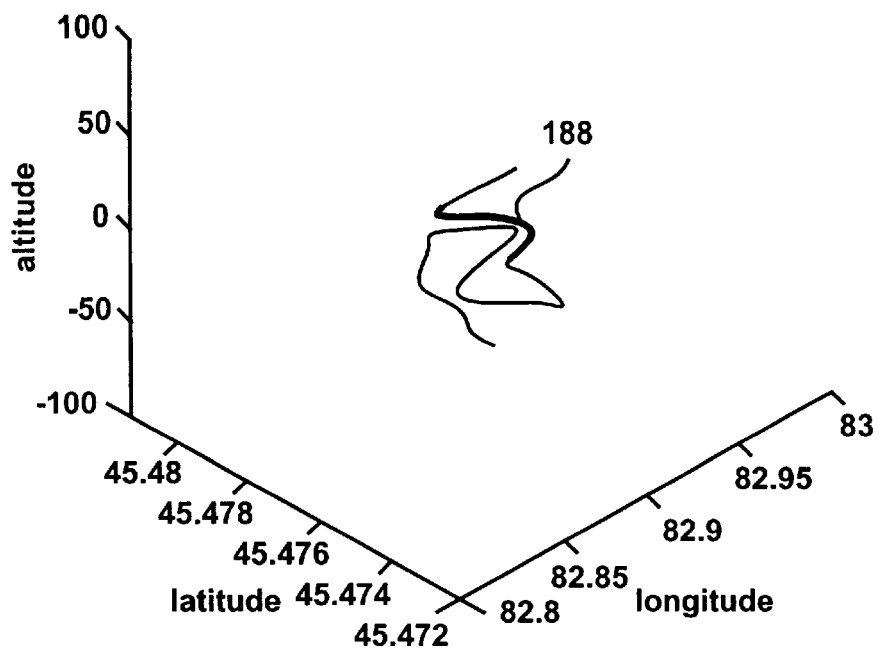
FIGS. 10A and 10B illustrate an exemplary second attempt at matching the vehicular path in FIG. 8 to a portion of the road network in FIG. 7.
Figure 10B:
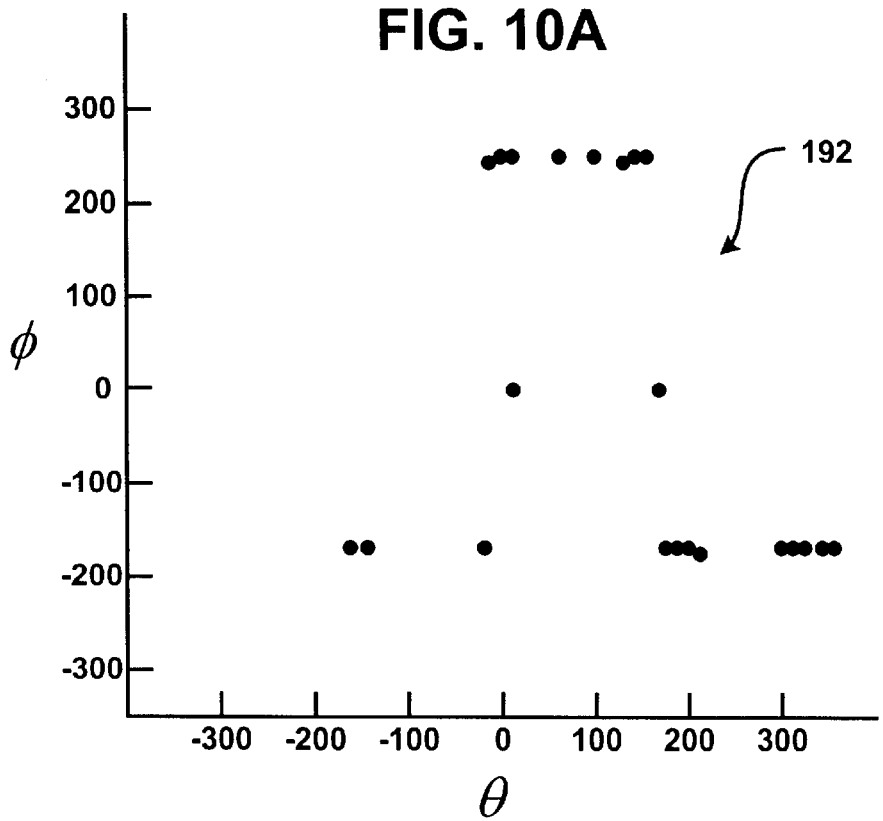

FIG. 10A illustrates an exemplary second attempt at matching the vehicular path 170 to a portion given by 188 of the road network 160. FIG. 10B is a plot 192 of the SAVM which indicates a SAVC of 3078.7672.

Figure 11A:
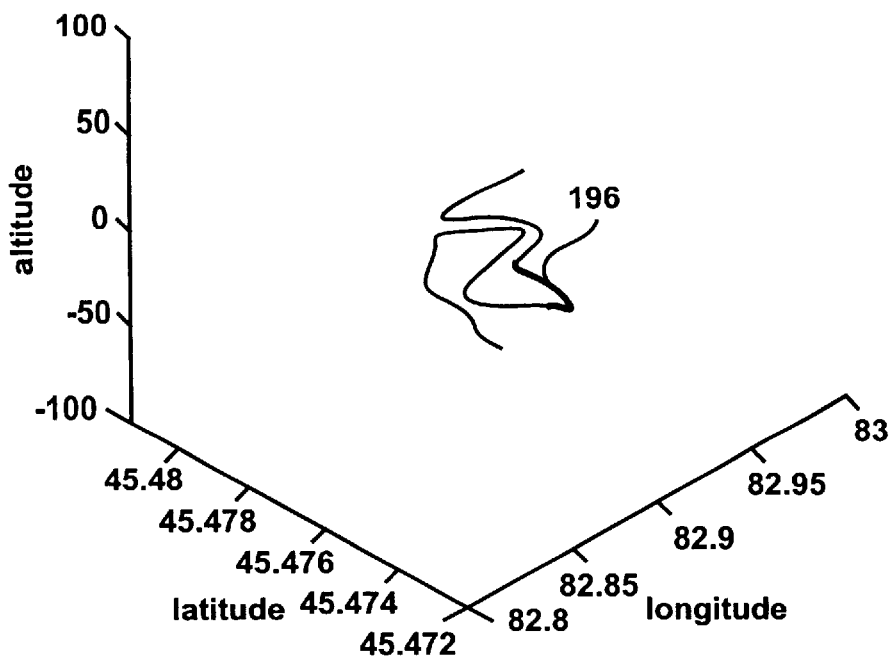
FIGS. 11A and 11B illustrate an exemplary third attempt at matching the vehicular path in FIG. 8 to a portion of the road network in FIG. 7.
Figure 11B:
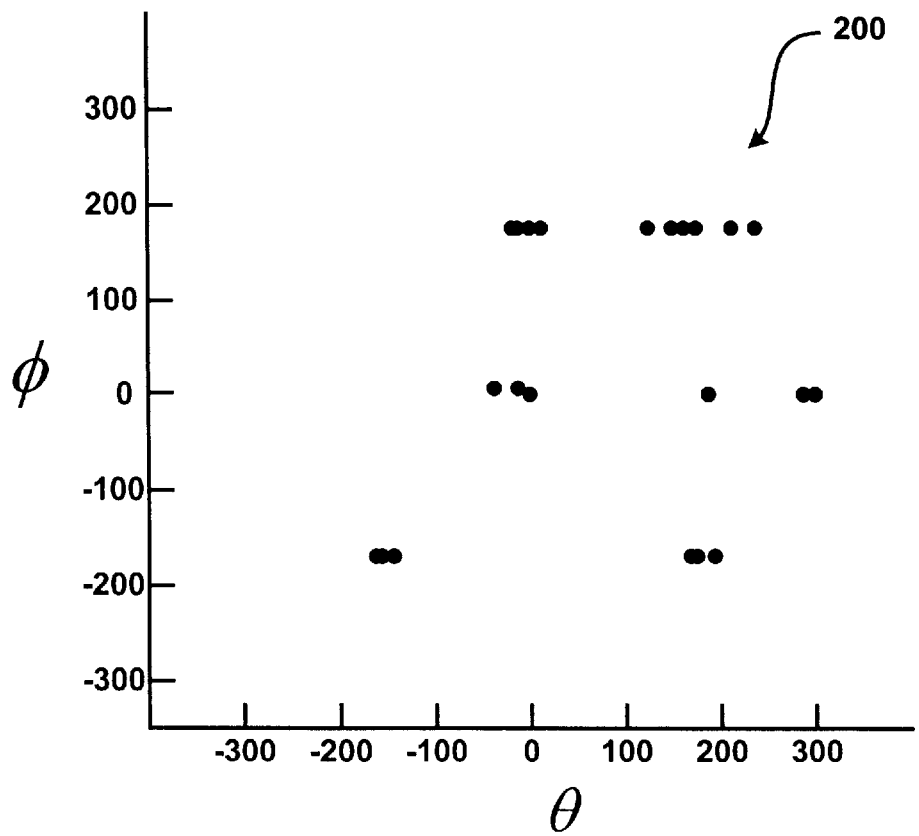

FIG. 11A illustrates an exemplary third attempt at matching the vehicular path 170 to a portion given by 196 of the road network 160. FIG. 11B is a plot 200 of the SAVM which indicates a SAVC of 2880.9778.

Figure 12A:
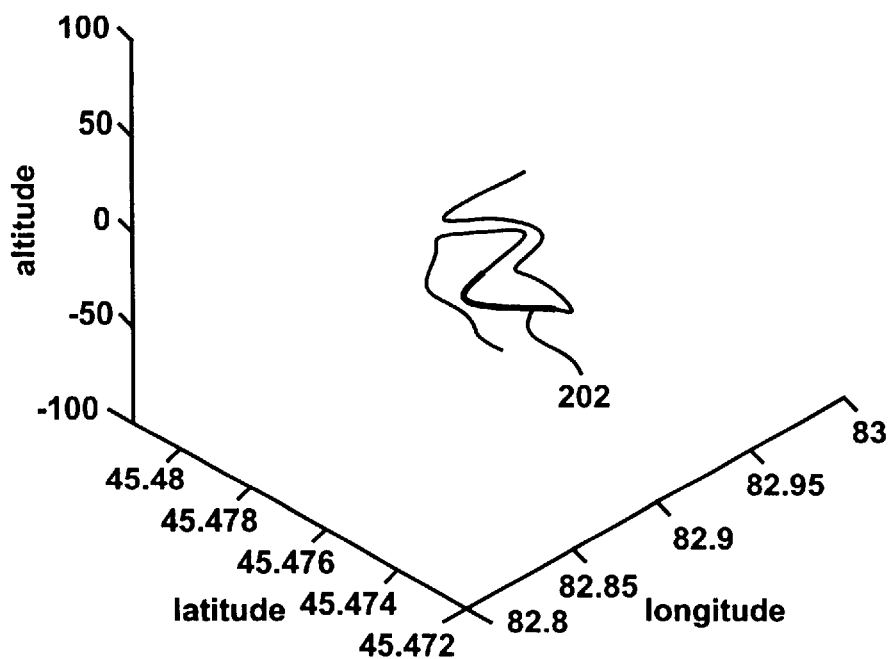
FIGS. 12A and 12B illustrate an exemplary fourth attempt at matching the vehicular path in FIG. 8 to a portion of the road network in FIG. 7.
Figure 12B:
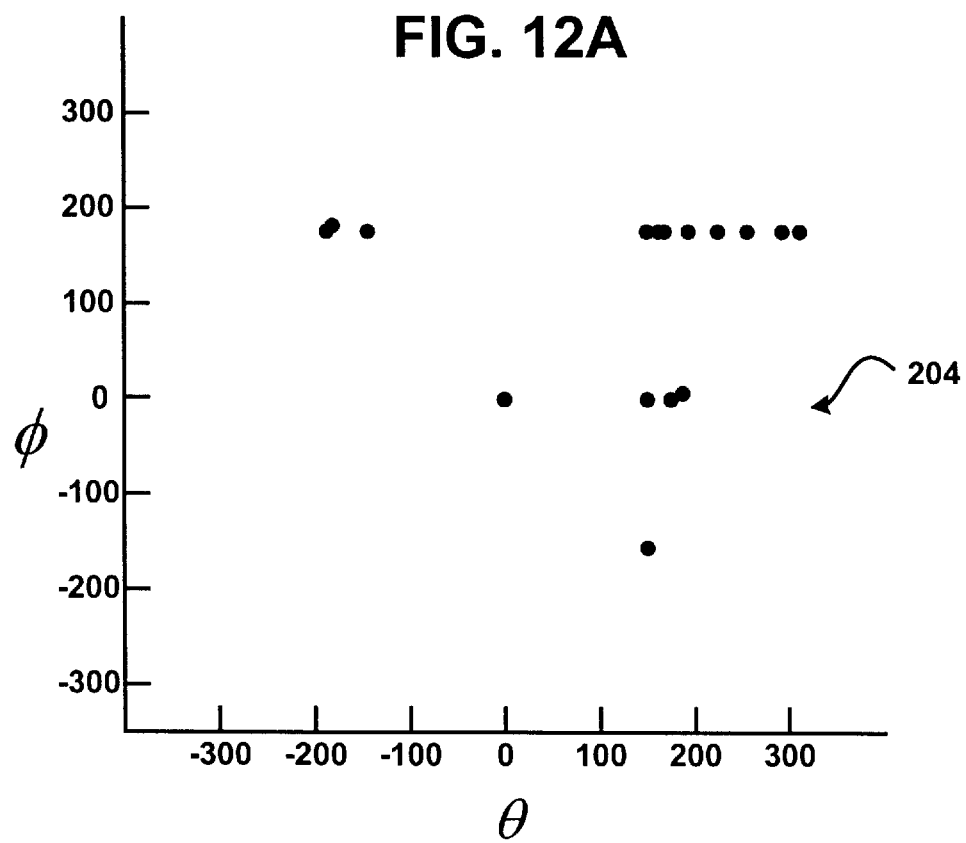

FIG. 12A illustrates an exemplary fourth attempt at matching the vehicular path 170 to a portion given by 202 of the road network 160. FIG. 12B is a plot 204 of the SAVM which indicates a SAVC of 3078.7672.

Figure 13A:
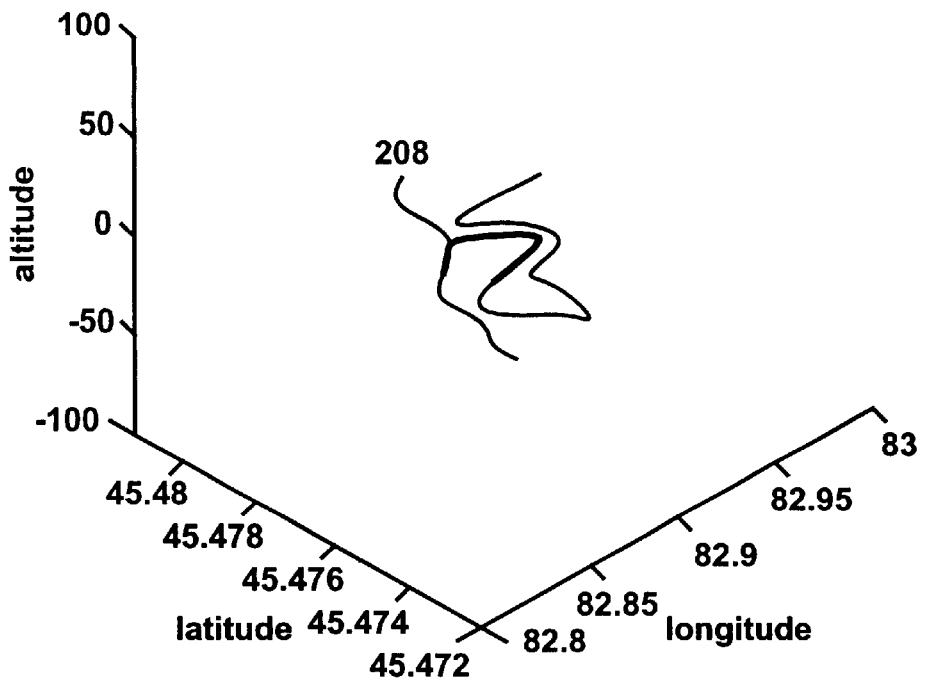
FIGS. 13A and 13B illustrate an exemplary fifth attempt at matching the vehicular path in FIG. 8 to a portion of the road network in FIG. 7.
Figure 13B:
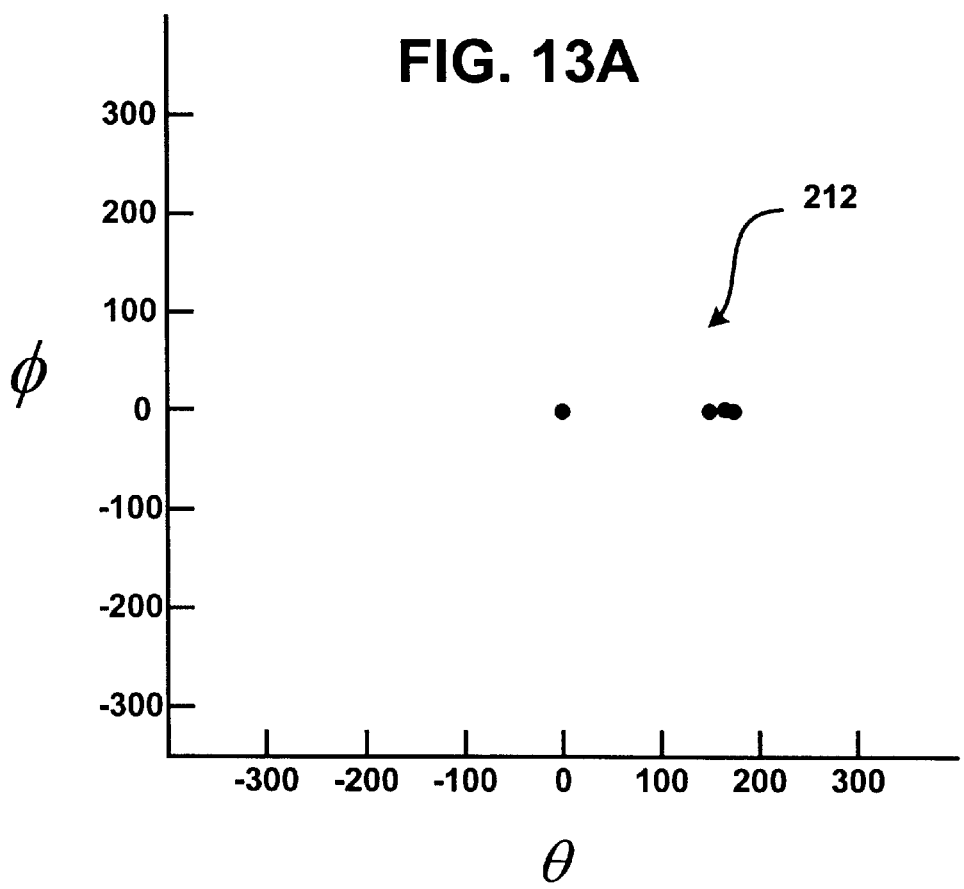

FIG. 13A illustrates an exemplary fifth attempt at matching the vehicular path 170 to a portion given by 208 of the road network 160. FIG. 13B is a plot 212 of the SAVM which indicates a SAVC of 213.2381.

Figure 14A:
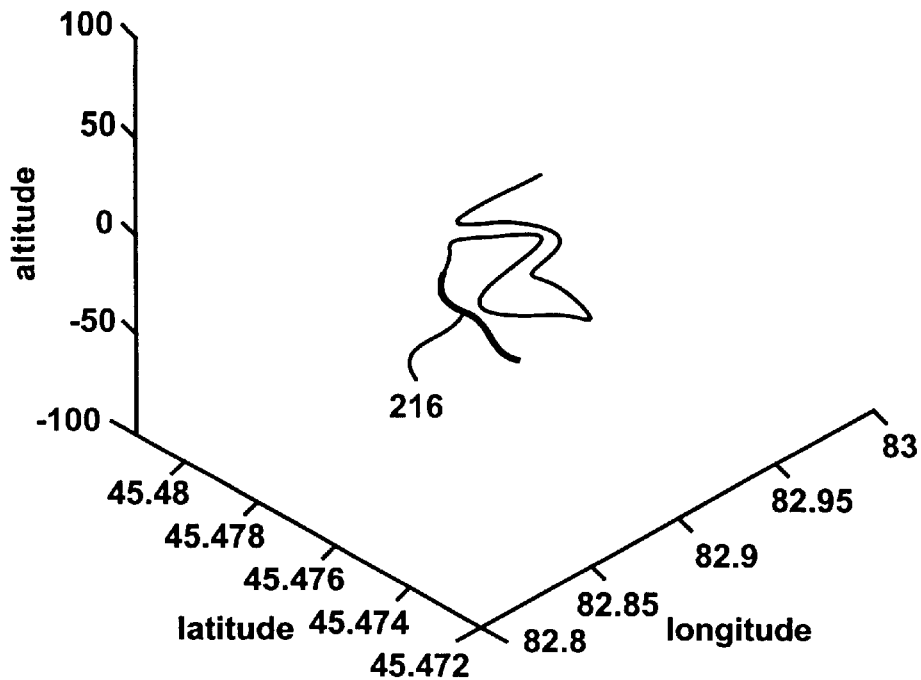
FIGS. 14A and 14B illustrate an exemplary sixth attempt at matching the vehicular path in FIG. 8 to a portion of the road network in FIG. 7.
Figure 14B:
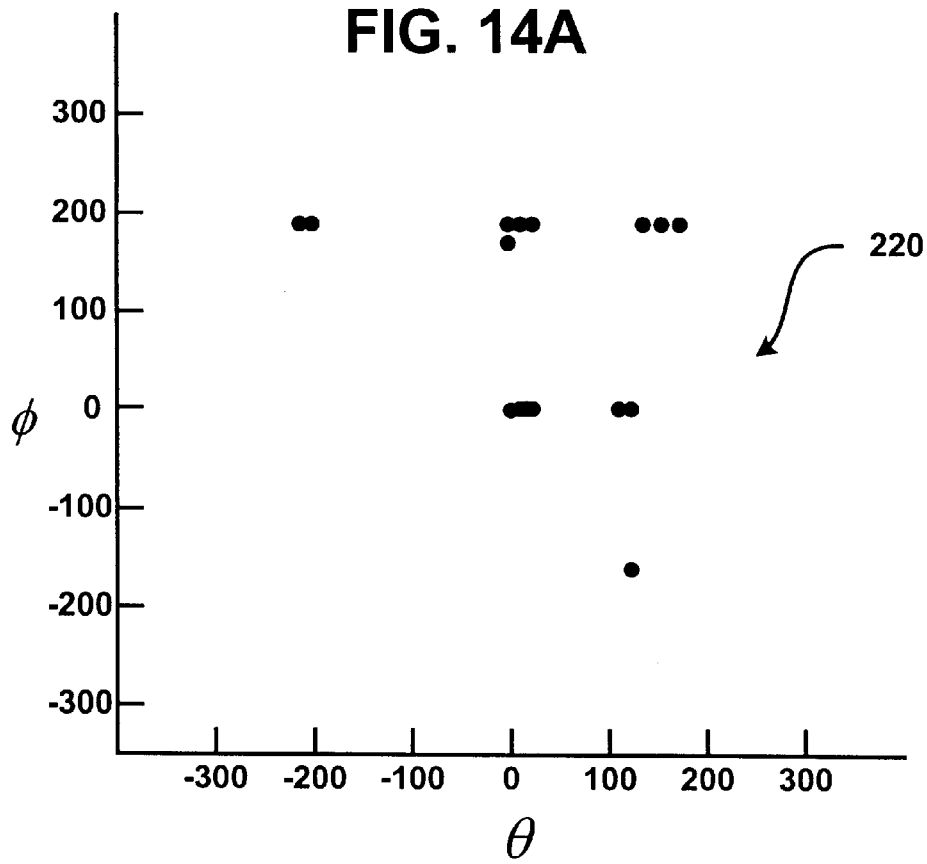
Figure 15:
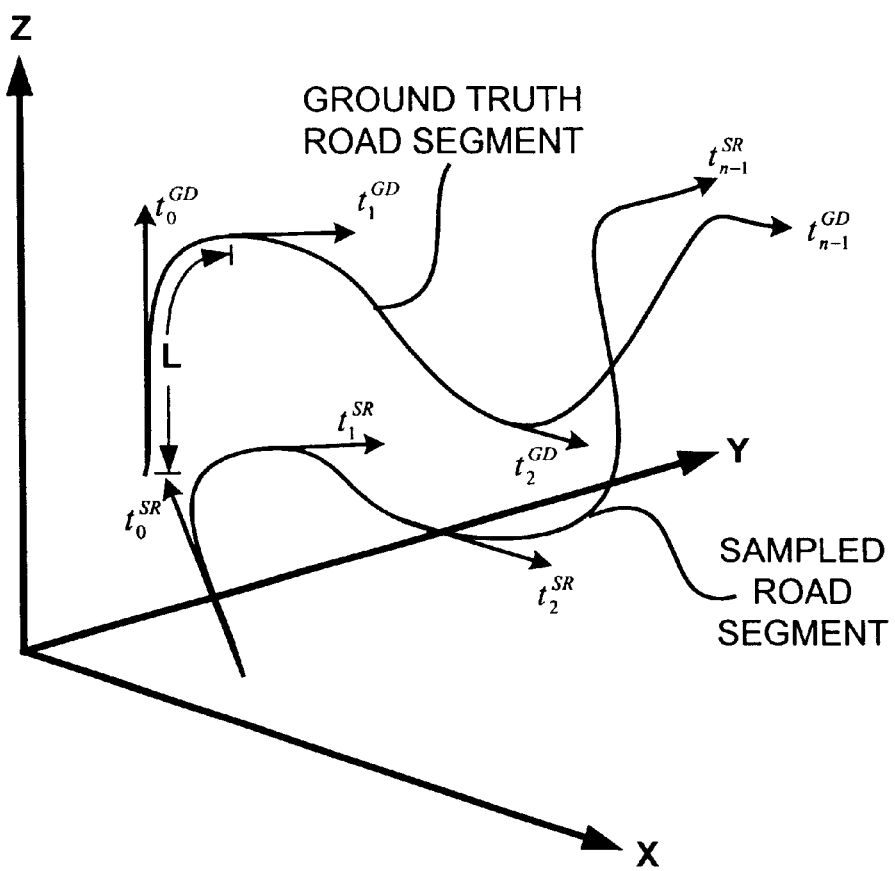
FIG. 15 illustrates an application of the spatial angle variation metric to determining the relative accuracy of a geographic database.

FIG. 14A illustrates an exemplary sixth attempt at matching the vehicular path 170 to a portion given by 216 of the road network 160. FIG. 14B is a plot 220 of the SAVM which indicates a SAVC of 2098.3197.

After six attempts at matching the vehicular path 170 to a given portion of the road network 160, the navigation system may determine which portion of the road network 160 corresponds to the vehicular path 170. By using the computed SAVC values for each attempt, the portion of the road network with the lowest SAVC of 213.2381 is found in FIGS. 13A and 13B. It is also apparent visually that the portion 208 of the road network 160 is the most correct match to the vehicular path 170.

APPLICATION OF SAVM TO ASSESSING ACCURACY OF GEOGRAPHIC DATA

The SAVM may be utilized for evaluating the accuracy of a geographic database. This application involves determining how closely a three-dimensional representation, referred to as a sampled representation, of a geographic feature (e.g., road segment, lake, railroad tracks, and so on) matches the actual geographic feature or more accurately known representation, referred to as ground truth, of the geographic feature. This application is described in connection with FIG. 15. This figure is similar to FIG. 2 except the three dimensional space curves are now labeled as "Ground Truth Road Segment" and "Sampled Road Segment", respectively. By computing the SAVM between sampled and ground truth segments, as described in relation to FIG. 2, the accuracy of the sampled road segment is compared with the ground truth segment. If the spatial angle variation coefficient is zero, then the sampled road segment is identical in shape to the ground truth road segment, (though it may be spatially translated, rotated, or scaled with respect to the ground truth segment.) The spatial angle variation coefficient can thus be used to determine the relative or shape accuracy of features represented in a geographic database.

ADVANTAGES

As described herein, the exemplary embodiments provide an effective and quantitative measure of the shape similarity between a pair of three-dimensional space curves. These embodiments are effective tools for comparing three-dimensional space curves while being simple, intuitive and computationally non-intensive. The exemplary embodiments are particularly useful for map matching as well as for other applications that require accurate positioning of the vehicle with respect to the underlying map data referenced by the system. Additionally, the exemplary embodiments are useful in measuring the accuracy of geographic data.

It should be understood that the programs, processes, methods and systems utilized or described herein are not related or limited to any particular type of vehicle positioning or database system, unless indicated otherwise. For example, positioning systems in planes, boats, and hand-held systems may utilize the methods exemplified herein. In view of the wide variety of embodiments to which the principles of the present embodiments can be applied, it should be understood that the illustrated embodiments are exemplary only, and should not be taken as limiting the scope of the present invention. For example, more or fewer elements may be used in the figures.

The claims should not be read as limited to the described order or elements unless stated to that effect. Therefore, all embodiments that come within the scope and spirit of the following claims and equivalents thereto are claimed as the invention.

What is claimed is:

1. A vehicle positioning method comprising:

determining in three-dimensions a trajectory of a vehicle;

determining a first set of tangent vectors at locations along the three dimensional space curve representation of the trajectory;

determining a second set of tangent vectors at corresponding locations along a three dimensional space curve representation of paths along a plurality of roads;

determining for corresponding locations an angle difference pair for the trajectory and the paths that defines the angular relationship between the first set and second set of tangent vectors at the corresponding locations;

computing a variance of the angle difference pairs; and determining that the vehicle is located on that road for which the variance is smallest.

2. The method of claim 1 wherein the vehicle trajectory is determined for a finite period of time.

3. The method of claim 1 wherein the path is finite in length.

4. The method of claim 1 wherein three-dimensional space curve representation of paths along a plurality of roads upon which the vehicle may be located are contained in a map database.

* * * * *